(12) United States Patent
Abu Qahouq

(10) Patent No.: US 9,948,173 B1
(45) Date of Patent: Apr. 17, 2018

(54) SYSTEMS AND METHODS FOR SHORT-TIME FOURIER TRANSFORM SPECTROGRAM BASED AND SINUSOIDALITY BASED CONTROL

(71) Applicant: The Board of Trustees of the University of Alabama, Tuscaloosa, AL (US)

(72) Inventor: Jaber A. Abu Qahouq, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 0 days.

(21) Appl. No.: 14/943,423

(22) Filed: Nov. 17, 2015

Related U.S. Application Data

(60) Provisional application No. 62/081,280, filed on Nov. 18, 2014.

(51) Int. Cl.
*H02M 1/32* (2007.01)

(52) U.S. Cl.
CPC .................... *H02M 1/32* (2013.01)

(58) Field of Classification Search
CPC ............ H02M 1/12; H02M 1/32; H02M 1/36; H02M 3/33507; H02M 3/33523; H02M 2001/0032; H02H 7/1213
USPC .............................................. 363/39, 50, 97
See application file for complete search history.

(56) References Cited

U.S. PATENT DOCUMENTS

| | | | |
|---|---|---|---|
| 7,245,512 B2* | 7/2007 | Leung ............... | H02M 3/33561 323/283 |
| 7,906,941 B2* | 3/2011 | Jayaraman .......... | H02M 1/4225 323/222 |
| 8,588,427 B2* | 11/2013 | Uhle ........................ | H04R 5/04 381/17 |
| 9,035,637 B1* | 5/2015 | Abu Qahouq ........ | H02M 3/157 323/283 |

* cited by examiner

*Primary Examiner* — Yemane Mehari
(74) *Attorney, Agent, or Firm* — Meunier Carlin & Curfman LLC

(57) ABSTRACT

A method of controlling the stability of a power converter in a closed-loop control system. The method includes inputting a variable to be controlled such as an output voltage of the power converter to a compensator or mathematical function for processing; determining, using the compensator, an error signal representative of a difference between the output voltage and a reference voltage; evaluating an energy content in a short-time Fourier transform spectrogram of the error signal from the compensator and/or evaluating the sinusoidality shape of the error signal; updating a transfer function of the compensator and other system parameters in accordance with the energy content or sinusoidality.

11 Claims, 8 Drawing Sheets

SYSTEMS AND METHODS FOR SHORT-TIME FOURIER TRANSFORM SPECTROGRAM BASED AND SINUSOIDALITY BASED CONTROL

CROSS-REFERENCE TO RELATED APPLICATION

The present application claims priority to U.S. Provisional Patent Application No. 62/081,280, filed Nov. 18, 2014, entitled "Systems and Methods for Short-Time Fourier Transform Spectrogram Based and Sinusoidality Based Control," which is incorporated herein by reference in its entirety.

BACKGROUND

Power converters are electrical devices that either convert electric energy from one form to another (e.g. between AC and DC), or change the voltage, current or frequency of the electric energy, or implement some combination of these. They can also provide impedance matching between a source and a load. Power converters can be classified into different categories, such DC-DC, AC-DC, DC-AC, and AC-AC power converters.

The design of stable and reliable closed-loop control systems for power converters finds use in many applications. Several existing theories, design criteria, and guidelines for the control system are available, varying in terms of complexity and application suitability. For example, one common method used to design a stable closed-loop control system for power converters is based on gain and phase margins criteria with Bode-plot analysis. Another method is based around the technique of root-locus design. While such methods are well developed and widely used, they have the drawbacks: For example, the methods are generalized rule-of-thumb design that do not guarantee achieving optimum performance for a given system. The implementation of the methods in designing high performance closed-loop control systems depends on the designer experience. The methods are sensitive to the theoretical approximations used to obtain the transfer function of the power converter. They are sensitive to the limitations and variations of the hardware used; they are sensitive to component parasitic variations of the power converter which may be caused at least by aging, temperature variations, and manufacturing process variations. The methods require a redesign when the power converter is adjusted or upgraded even slightly. In order to implement advanced control schemes to auto-tune the closed-loop control system transfer function, the methods require measuring the new system transfer function each time. This is complicated and requires more hardware to implement. Most on-line auto tuning methods either require interrupting the closed-loop during the tuning operation or require injecting additional signals. This creates a disturbance to the system output which is not desirable in most applications.

SUMMARY

Implementations of the present disclosure overcome the problems of the prior art by providing a control system for maintaining the stability of a power converter in a closed-loop control system using the energy content (or signal strength in general) information of the compensated feedback error signal from a short time Fourier transform (STFT) and/or by determining how close the compensated feedback error signal is to a pure sinusoidal signal.

These and other features and advantages of the implementations of the present disclosure will become more readily apparent to those skilled in the art upon consideration of the following detailed description and accompanying drawings, which describe both the preferred and alternative implementations of the present disclosure.

In one aspect of the implementation a method—the STFT spectrogram-based closed-loop (STFT-SPM-CL) method—of controlling the stability of a power converter in a closed-loop control system is disclosed. This comprises: inputting an output voltage of the power converter to a compensator; generating, using the compensator, a compensated error signal by multiplying a difference between the output voltage and a reference voltage by a transfer function in a frequency domain or by a fixed number such as one; evaluating an energy content by using a STFT spectrogram of the compensated error signal from the compensator; and determining the stability of the power converter and/or updating the compensator parameters or any other parameter in the system to improve stability in accordance with the energy content of the compensated error signal. The power converter can be of any type, for example a DC-DC, AC-DC, DC-AC, and AC-AC power inverter. For example the power converter circuit topology can be a buck, boost or buck-boost, forward, flyback, push-pull, full-bridge, and half-bridge DC-DC power converters. The closed loop compensator can be of any type, for example an integral, derivative, proportional-integral, proportional-derivative, or proportional-integral-derivative control system component. The stability of the power converter in the closed-loop control system is either the absolute or the relative stability of the power converter. The STFT spectrogram can be the normalized squared magnitude of the STFT of the compensated error signal. The STFT spectrogram of the compensated error signal can be computed by a computer or a digital signal processing chip.

In another aspect of the implementation, a method for automatically tuning the stability of a power converter in a closed-loop control system is disclosed. This comprises evaluating an energy content in a STFT spectrogram of an error signal from a compensator; and auto-tuning the control system by adjusting the transfer function of the compensator or any other parameter in the system based on the compensated error signal energy content by using the STFT spectrogram at different frequencies and/or by evaluating how close the errors signal to a pure sinusoid at given frequency. The input or output impedance of the power converter in the closed-loop control system can vary with time. Furthermore, the temperature of the closed-loop control system can vary with time. Finally, the closed-loop control system performance can decrease as a result of aging.

In another aspect of the implementation an apparatus for automatically tuning the stability of a power converter in a closed-loop control system is disclosed. The apparatus can comprise a closed-loop compensator; a processor, and a PWM. The processor evaluates energy content in a STFT spectrogram of an error signal to update the duty cycle of the PWM. This can be used to diagnose the performance of the power converter for the detection of faults, providing notifications for maintenance. The power converter in the closed-loop control system can be used for aerospace, mission critical military and medical equipment, power grid equipment, and electric and hybrid-electric vehicle systems, among many other applications. This apparatus can be used for online sensing and evaluation of stability of the power converter and offline closed-loop control design and optimization. Additionally, the apparatus can comprise a smart software package for assisted or auto design optimization of the closed-loop control system. Finally, the apparatus can be realized as a software only or software-hardware diagnosis tool.

In another aspect of the disclosure the compensated error signal is evaluated to determine how close it is to a pure sinusoidal signal with a single frequency in order to determine stability, perform auto-tuning, and/or perform diagnosis and fault detection. This can be used alone or together with the energy content of the compensated error signal.

In another aspect of the disclosure, a method of controlling the stability of a plant in a closed-loop control system is described. The method includes inputting an output signal of the plant to a compensator; determining, using the compensator, an error signal comprising a difference between the output signal and a reference signal; comparing the error signal to a pure sinusoidal signal at a frequency of interest and updating the closed-loop control system parameters in accordance with the comparison. The plant can be a power converter; however, method can also be used with other similar systems other than power converters and inverters, such as electromechanical systems. The output signal can be the output voltage, output current, input power, or output power of the plant. The reference signal can be a reference voltage, a reference current, or a reference power. The output signal can be a temperature, a pressure, a system loss factor, or system efficiency. The frequency of interest can be switching frequency of the power converter. The power converter can be a DC-DC power converter, AC-DC power converter, DC-AC power inverter, or AC-AC power inverter. The power converter can be a circuit having a buck, boost and buck-boost topology. The power converter can be a circuit having a forward, flyback, push-pull, full-bridge, and half-bridge topology. The compensator can be an integral, derivative, proportional-integral, proportional-derivative, or proportional-integral-derivative control system component. Finally, the stability of the plant in the closed-loop control system can be the absolute or the relative stability of the system.

BRIEF DESCRIPTION OF THE DRAWINGS

FIGS. 5a and 5b represent non-optimum conditions; FIGS. 5c and d represent optimum conditions; and FIGS. 5e and f represent unstable conditions. Furthermore, FIGS. 5a, 5c, and 5e are under steady-state operation while FIGS. 5b, 5d, and 5f are under a 0A to 10A load current transient.

DETAILED DESCRIPTION

Implementations of the present disclosure now will be described more fully hereinafter. Indeed, these implementations can be embodied in many different forms and should not be construed as limited to the implementations set forth herein; rather, these implementations are provided so that this disclosure will satisfy applicable legal requirements. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms.

A number of aspects of the systems, devices and methods have been described. Nevertheless, it will be understood that various modifications may be made without departing from the spirit and scope of the disclosure. Accordingly, other aspects are within the scope of the following claims.

In one aspect of the implementation a method of controlling the stability of a power converter in a closed-loop control system is disclosed. This includes: inputting an output voltage of the power converter to a compensator; determining, using the compensator, a compensated error signal representative of a difference between the output voltage and a reference voltage and could be multiplied by a constant, frequency dependent transfer function with poles and zeros, or other type of function; evaluating an energy content in a STFT spectrogram of the error signal from the compensator and or how close the error signal is to a pure sinusoidal signal at a frequency of interest (e.g. switching frequency of the power converter)—to be called here sinusoidality for short; and updating a transfer function (e.g. gain, poles, and/or zeros) of the compensator in accordance with the energy content and/or sinusoidality and/or updating any other design parameter (e.g. capacitor value, inductor value, switching frequency, and/or circuit configuration). In one aspect of the implementation, estimating the transfer function of the power converter system and the transfer function of the compensator or knowledge of the component values and parasitics are not necessarily needed for control.

Figure 1:
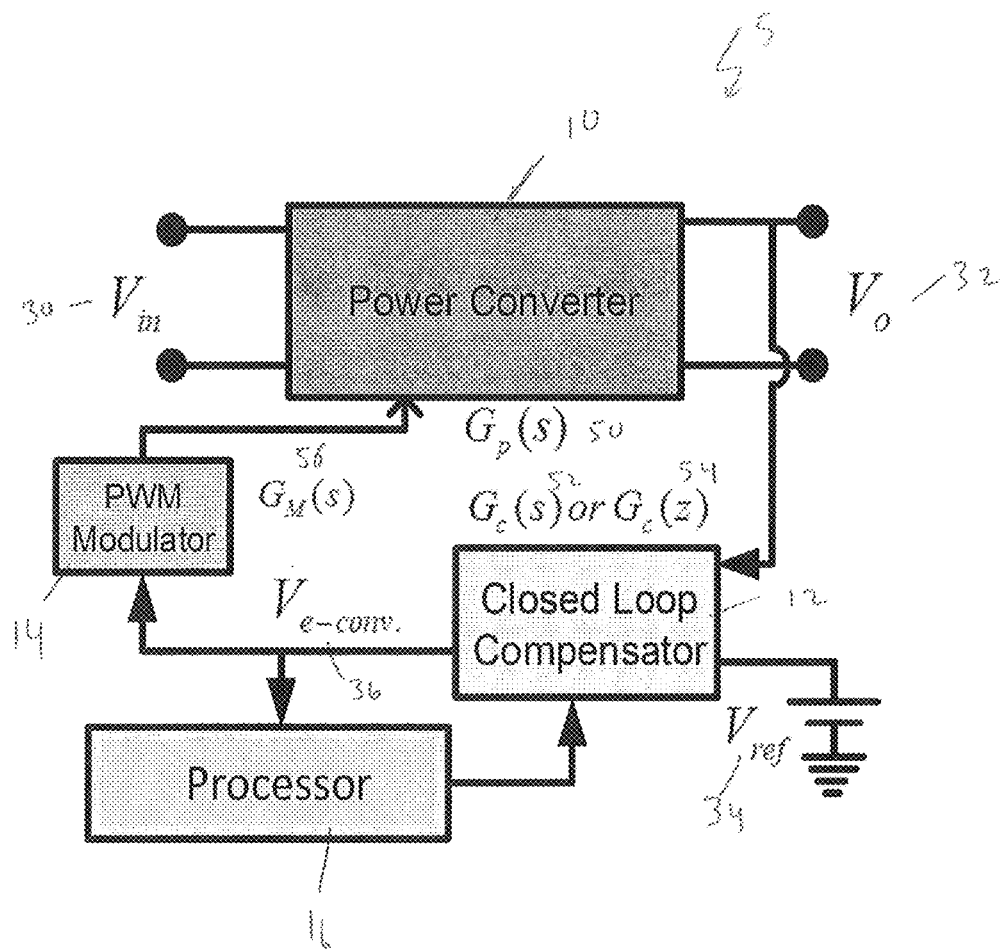
FIG. 1 shows a block diagram of a power converter with a closed-loop control system comprising a closed-loop compensator, a PWM, and a processor.

FIG. 1 shows a block diagram of a power converter 10 in a closed-loop control system 5 comprising a closed-loop compensator 12, a PWM 14, and a processor 16. The closed-loop system can regulate the output voltage $V_o$ 32 to a value equal to the reference voltage $V_{ref}$ 34. It could also regulate the output current ($I_o$) and/or the output power ($P_o$). The closed-loop compensator 12 is used to alter the operating conditions of the closed-loop system. The PWM 14 is used to turn the power converter controlled switches on and off at a given frequency, called the switching frequency $f_{sw}$ (one divided by one switching time period), and can be characterized by its duty cycle. The duty cycle is the ratio between the ON time and the switching time period in one cycle. The processor 16 obtains an error signal $V_{e\text{-}conv}$ 36 from the closed-loop compensator 12. The error signal comprises the difference between a reference voltage 34 to the closed-loop compensator 12 and the output voltage 32 from the power converter 10. The processor 16 performs an analysis of the error signal 36. In one aspect, this analysis comprises computing the STFT spectrogram of the error signal 36, evaluating the energy content of the STFT at specific frequencies, including the switching frequency $f_{sw}$. The processor can then update a transfer function (a mathematical relationship between the input and output of a system) of the closed-loop compensator in accordance with the energy content (or signal strength) of the STFT (or other similar mathematical method that results in the same effect). This can lead to the system achieving stability (relative stability and/or absolute stability) and better steady-state and dynamic performances. As per FIG. 1, the transfer function for the power converter main stage (without closed loop control and PWM) is $G_{p(s)}$ 50. The transfer function of the closed-loop control system's compensator is given by $G_{c(s)}$ 52, or $G_{c(z)}$ 54 if a digital compensator is used. Finally, the transfer function of the PWM is given by $G_{M(s)}$ 56.

The power converter 10 can be implemented with many different topologies, for example, DC-DC converters that include energy storage components such as magnetic components. In these kinds of DC-DC power converters, energy is periodically stored into and released from a magnetic field in an inductor or a transformer, at a frequency which can range from several kHz to MHz, but could be much higher or lower. By adjusting the duty cycle, the amount of power transferred can be controlled. This can allow for controlling the output voltage, input current, output current, or to maintain a constant power. The magnetics-based DC-DC converters may have isolation between the input and the output (i.e. with a transformer). These topologies include forward, push-pull, half-bridge, and full-bridge, among many others. Alternatively, the magnetics-based DC-DC converters may be non-isolated (i.e. without a transformer). These topologies includes buck (where the output voltage is lower than the input voltage), boost (where the output voltage is higher than the input voltage), and buck-boost (where the output voltage can be higher or lower than the input), among many others. Each topology has its own advantages and disadvantages and suitability for specific applications and voltage/current/power levels.

Figure 2A:
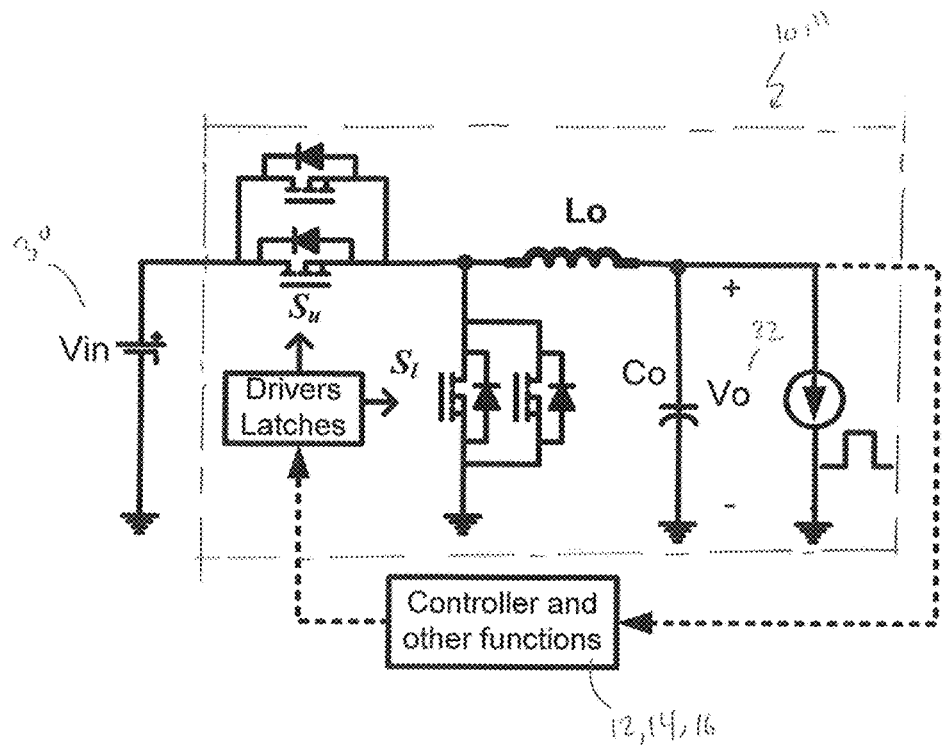
FIG. 2a shows an example of single phase DC-DC buck power converter topology that could be used in the closed-loop control system.
Figure 2B:
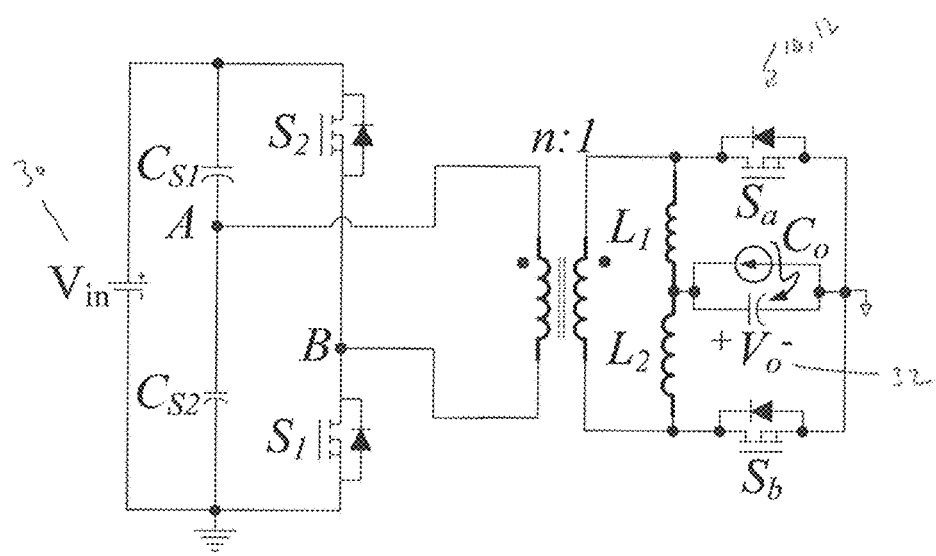
FIG. 2b shows an example of a half-bridge power converter with a current-doubler on the isolated secondary side.

FIGS. 2a and 2b show examples of possible power converter 10 topologies that could be used in the closed-loop control system 5. FIG. 2a shows a circuit diagram of an example DC-DC buck power converter 11 for illustration purposes. FIG. 2b shows a circuit diagram of a power converter 12 where the power converter comprises a half-bridge with a current-doubler secondary side.

Figure 3:
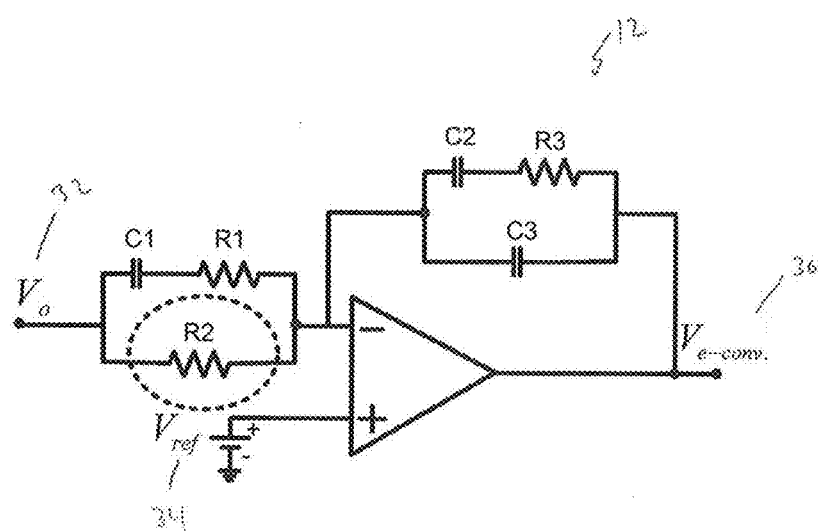
FIG. 3 shows an example of an analog closed-loop compensator.

In a DC-DC power converter like the buck converter 11 shown in FIG. 2a, the output voltage 32 is sensed and inputted to a closed-loop compensator 12 such as the one shown in FIG. 3. FIG. 3 shows an example of a closed-loop compensator circuit 12 which is an analog closed-loop compensator; however, the closed-loop compensator can also be a digital compensator. A prototype having a PID (Proportional-Integral-Derivative) compensator, or any other type of compensator or mathematical function, as the closed-loop compensator can be implemented using an analog compensator with a network consisting of resistors and capacitors that control the gain, and pole-zero locations. One of the resistors (R2) that mainly affects the gain (and negligibly affects the phase) in this design case is varied in order to investigate the effect on the error signal 36 and the stability of the closed-loop control system.

Figure 4:
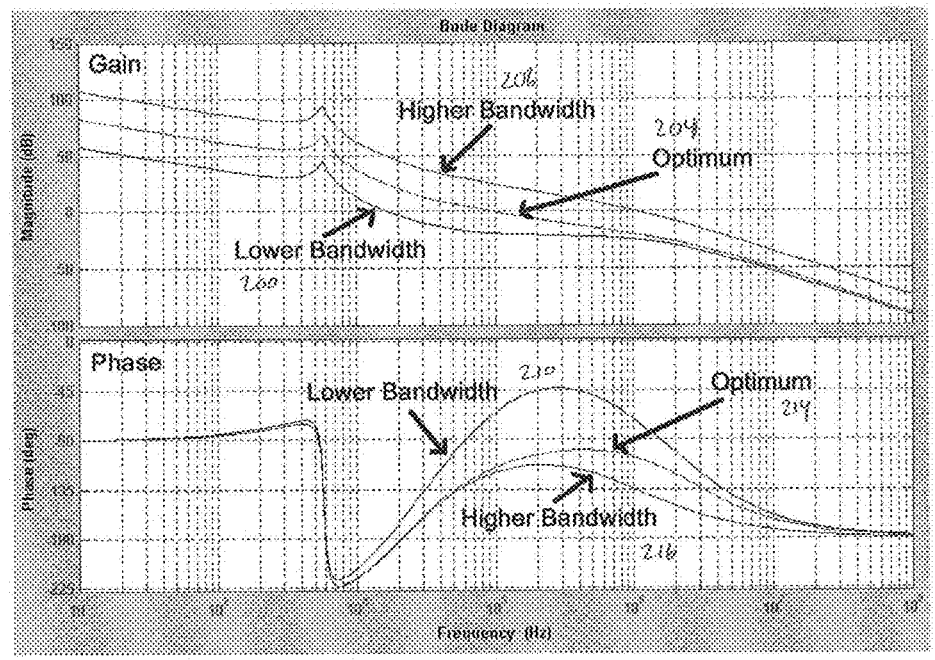
FIG. 4 shows a Bode plot for the power converter closed-loop control system implementing the closed-loop compensator circuit of FIG. 3.
Figure 5:
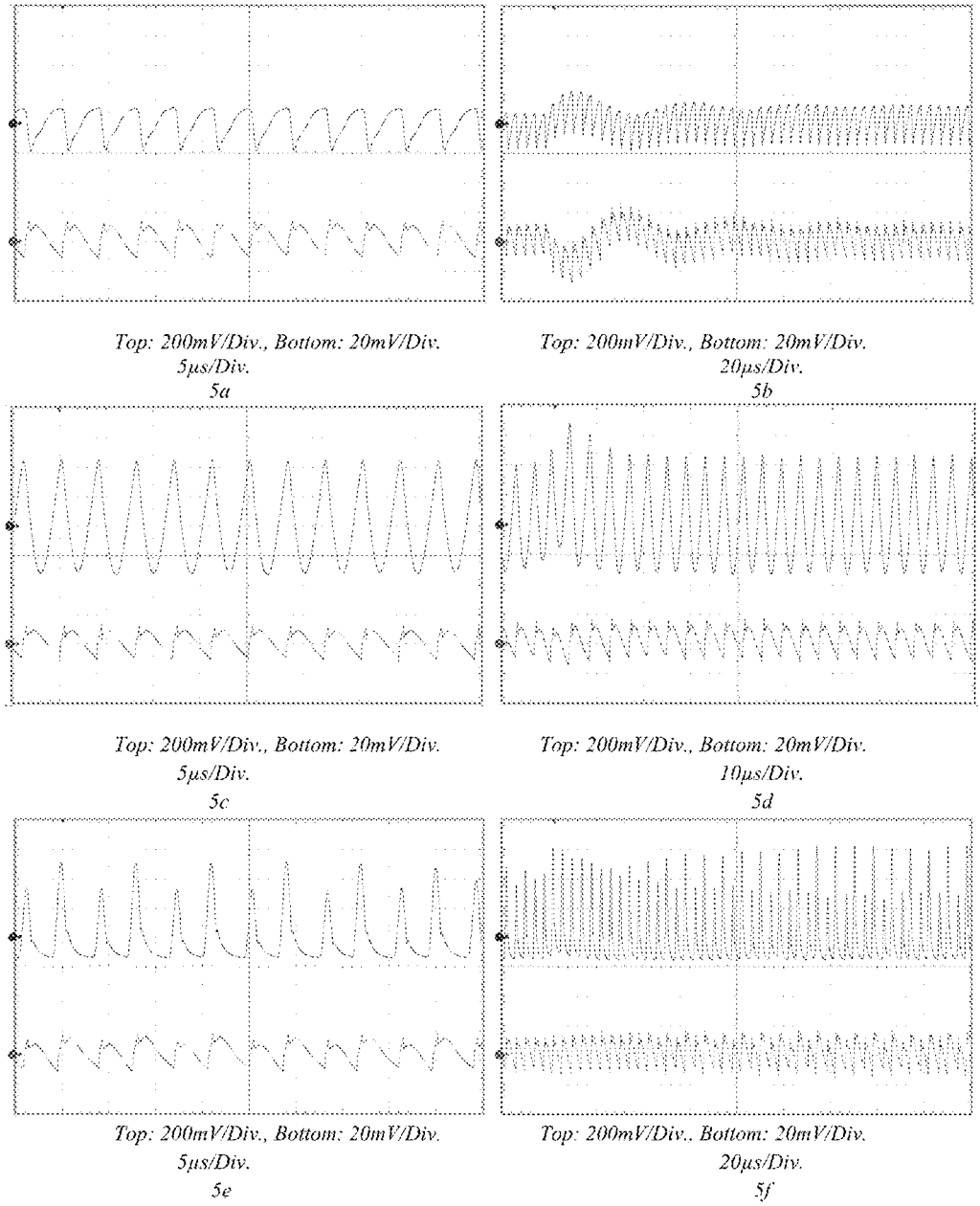
FIG. 5 shows experimental results of the output voltage and the compensated error signal of the power converter in the closed-loop control system implementing the closed-loop compensator circuit of FIG. 3 as an example.

FIG. 4 shows a Bode plot the closed-loop control system 5 implementing the closed-loop compensator circuit 12 of FIG. 3, for three different values of the resistor R2 in FIG. 3. In FIG. 5 it is shown that a first value of R2 results in a lower gain 200 and lower bandwidth 210 below the optimum operation point 204, 214; a second value of R2 results in medium gain 204 and optimum bandwidth 214 for an optimum operation point 204, 214, and a third value of R2 results in higher gain 206 and higher bandwidth 216 that results in an unstable operation. It could be observed from FIG. 4 results that as the gain is increased, the error signal 36 shape is closer to a pure/ideal sinusoidal signal at the switching frequency (and the energy content is higher at the switching frequency as discussed next and shown in FIG. 5) and the dynamic output voltage deviation (how much the output voltage deviates from its desired steady-state value) and settling time (how long it takes from the output voltage to return to its desired steady-state value after it deviates) are reduced (which indicates better performance) up to a point when the closed-loop control system 5 becomes unstable.

FIG. 5a-5f shows experimental results of the output voltage 32 and the error signal 36 of the power converter 10 in the closed-loop control system 5 implementing the closed-loop compensator circuit 12 of FIG. 3, for the same three different values of the resistor R2 in FIG. 4. The power stage specs for this example are: 12V input voltage, 1.4V output voltage, 315 nH output filter inductor, 2.6 mF output filter capacitor, and ~250 kHz switching frequency ($f_{sw}$). In each graph, the top trace represents the compensator's error signal 36 from the closed-loop compensator 12 versus time shown at 200 mV/Div. resolution, while the bottom trace represents the output voltage 32 from the power converter 10 versus time shown at 20 mV/Div. resolution. The transition from stable to unstable operation is shown in FIG. 5. As the gain and/or bandwidth is increased the error signal 36 becomes stronger at the switching frequency and weaker at other frequencies (becomes closer to a pure/ideal sinusoid at the switching frequency), leading to a reduction in the dynamic output voltage deviation and settling time (better performance) per this invention up to a point where the closed-loop control system 5 becomes unstable. When the system becomes unstable the error signal becomes weaker at the switching frequency and stronger at other frequencies (becomes less close to a pure/ideal sinusoid at the switching frequency). In FIGS. 5a, 5c and 5e, the closed-loop control system 5 is operating under steady-state conditions, while in FIGS. 5b, 5d and 5f, the closed-loop control system 5 is operating under a 0 to 10 Amp load current transient. In FIGS. 5a and 5b the signals are shown in 5 μsec/Div. resolution and 20 μsec/Div. resolution, respectively, and are non-optimum for a first value of R2 corresponding to lower gain and/or bandwidth. In FIGS. 5c and 5d, the signals are again shown in 5 μsec/Div. resolution and 20 μsec/Div. resolution, respectively, and are optimum (improved performance) for a second value of R2 corresponding to higher gain and/or bandwidth. In FIGS. 5e and 5f the signals are again shown in 5 μsec/Div. resolution and 20 μsec/Div. resolution, respectively, and are unstable for a third value of R2 corresponding to even higher gain and/or bandwidth.

In other words, FIG. 5 illustrates that when the bandwidth of the system is lower (and the design is not optimum), the compensated error signal shape becomes less close to a pure/ideal sinusoidal signal with frequency that is equal to the PWM switching frequency. In other words, the compensated error signal (which is composed of several sinusoidal signals at different frequencies) strength (or energy content) at the switching frequency becomes weaker (or has less energy content) at the switching frequency and stronger (or has higher energy content) at other frequencies as the bandwidth decreases. On the contrary, when the bandwidth of the system is higher (and the design is better, i.e. at optimum or closer to optimum), the compensated error signal shape becomes closer to a pure/ideal sinusoidal signal with frequency that is equal to the PWM switching frequency. In other words, the compensated error strength (or energy content) at the switching frequency becomes stronger (or has higher energy content) at the switching frequency and weaker (or has less energy content) at other frequencies as the bandwidth decreases. If the bandwidth continues to increase up to a point where the stability of the system is lost and oscillations at other frequencies start to occur, the error signal becomes again less close to pure/ideal sinusoidal signal with frequency. Based on this invention, this behavior is used to design, tune, auto-tune, and or diagnose the system.

Figure 6:
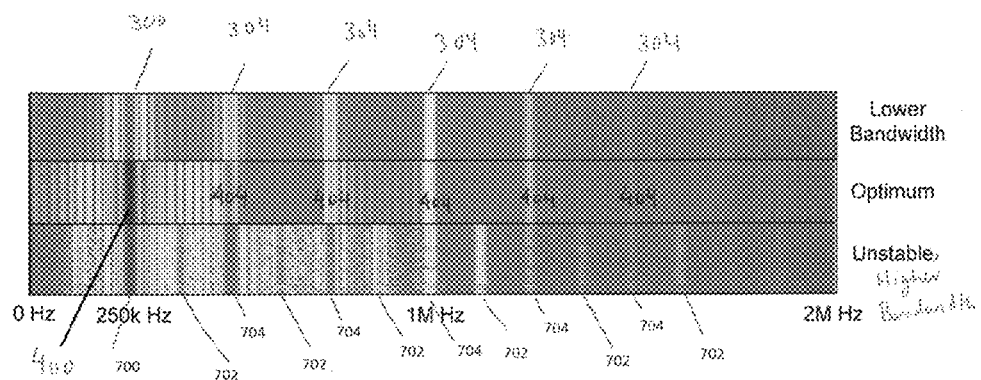
FIG. 6 shows the STFT spectrogram of the compensated error signal of the power converter in the closed-loop control system implementing the closed-loop compensator circuit of FIG. 3.
Figure 7:
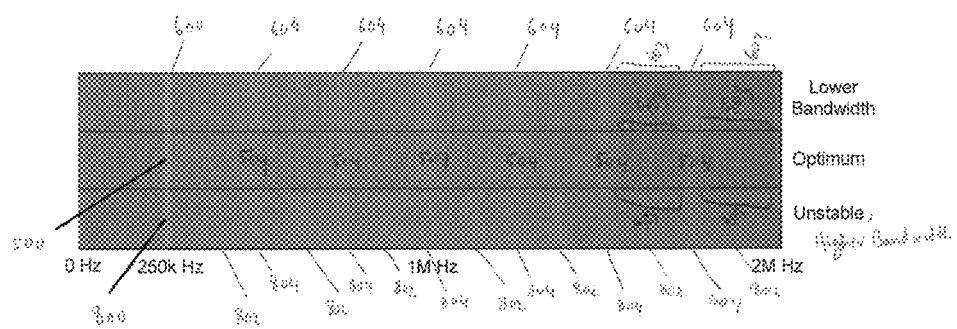
FIG. 7 shows the STFT spectrogram of the output voltage of the power converter in the closed-loop control system implementing the closed-loop compensator circuit of FIG. 3.

FIGS. 6 and 7 show an STFT spectrogram—a visual representation of the magnitude of a signal for a range of frequencies in the signal as it varies with time—of the error signal 36 and output voltage 32, respectively. In FIGS. 6 and 7 the horizontal x-axis represents the frequency and the vertical y-axis represents time; the third z-axis represents the magnitude of the signal (i.e. the signal strength) by the intensity of a color, with darker red color indicating higher strength or energy content. The STFT spectrogram diagrams for the three experimental cases measured by an analyzer are shown. FIG. 6 shows that for the error signal 36 from the closed-loop compensator 12, the signal strength at 250 kHz (the switching frequency $f_{sw}$ for the PWM 14) is larger for the higher bandwidth (unstable) 700 and optimum case 400 (also corresponding to 206 and 204 in FIG. 4) compared with the lower bandwidth case 300 (also corresponding to 200 in FIG. 4). In FIG. 7, representing the STFT of the output voltage 32, the signal strength is not as distinguishable as FIG. 6 for the error signal 36. Compare for instance the signal strength of 600, 500, and 800 at the switching frequency; and even the 604, 504, and 804 at the harmonics to the switching frequency. FIG. 7's 802 offers no further distinguishing contrast as 702 did in FIG. 6. In FIG. 7, the spectrograms are only different for the higher bandwidth, unstable case. In this case, the frequency content becomes stronger at higher frequencies (i.e. compare for instance 603, 503 to 803 in the 1.5-2 MHz frequency range).

Hence, in one method, the relative stability and absolute stability of the example closed-loop control system can be determined from the energy content or signal strength of the STFT spectrogram (or any other mathematical operation that results in the same) of the error signal 36 as represented in FIG. 6. As the energy content of the STFT spectrogram becomes stronger at the switching frequency for the PWM, and lower at harmonics of switching frequencies (e.g. $2f_{sw}$ and $4f_{sw}$), the relative stability of the system becomes better. Alternatively, as the energy content of the STFT spectrogram becomes weaker at the switching frequency for the PWM and stronger at the harmonic frequencies, the relative stability of the closed-loop system becomes worse. When the energy content of the STFT spectrogram for the error signal 36 at these harmonic frequencies becomes as strong as it is at the switching frequency or starts to increase again at other frequencies, the absolute stability of the closed-loop control system 5 is compromised and the system becomes unstable. The latter case is an indication that the error signal 36 has started to oscillate (FIG. 5e, top trace) at different frequencies. The same conclusion cannot be clearly made from the STFT spectrogram of the power converter output voltage 32, even though it can be used as a supporting indication.

In another method, the relative stability and absolute stability of the example closed-loop control system can be determined from the how close the error 36 signal is to a pure/ideal sinusoidal signal at single frequency which is in this example the switching frequency. As the error signal become closer to a pure sinusoidal signal at the switching frequency for the PWM, the stability of the system becomes better. As the error signal become not closer/far from to a pure sinusoidal signal at the switching frequency for the PWM, the stability of the system becomes worse. This is supported by FIG. 5 and FIG. 6.

Both of the above methods can be used to diagnose the stability of the system, design a stable improved system, tune the design of the system, auto-tune the system, and/or give warning on the system performance. This can be used as a part of a hardware, part of a software, or as a manual procedure.

Figure 8:
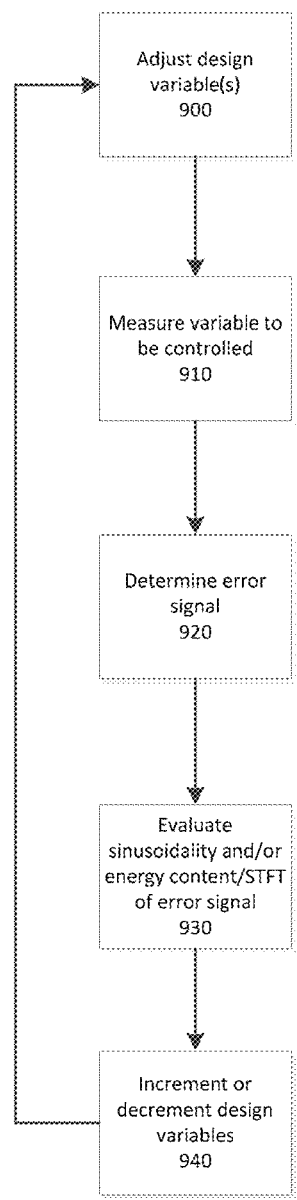
FIG. 8 shows a flowchart of a method for implementing the STFT-based closed-loop control of the power converter.

FIG. 8 shows an example general flowchart of a method for implementing the STFT-based closed-loop control of the power converter with respect to FIG. 1 and the disclosure. First in 900, the system adjusts or perturbs one or more design variables in the system (i.e. poles and zeros of a compensator) in the direction determined in the previous step. Such design variables comprise compensator gain, compensator poles, compensator zeros, compensator component values, compensator mathematical values, power converter component values, inductor value, capacitor value, and switching frequency, among others. In 910, the variable to be controlled (i.e. output voltage 32 of the power converter 10, is measured. In 920, the error signal 36 is determined by the compensator 12 or other mathematical function. Next, in 930, the sinusoidality and/or the energy content/STFT of the error signal is determined. In the case of sinusoidality, the signal shape is compared to a pure/ideal sinusoidal signal at a frequency of interest (e.g. the switching frequency). In the case of STFT, the energy content of the STFT spectrogram of the error signal at the switching frequency for the PWM, and at lower at harmonics of switching frequencies (e.g. $2f_{sw}$ and $4f_{sw}$) is determined and evaluated. Based on the comparison or energy content evaluation in 930, in 940, the design variables in 900 are either incremented or decremented to improve system stability and performance. This is done by increasing the sinusoidality of the error signal, i.e. making the signal shape closer to a pure/ideal sinusoidal signal at the frequency of interest (e.g. the switching frequency), or obtaining a spectrogram that has more or less energy content in frequencies of interest (see FIGS. 6 and 7 and discussion of those Fig.'s for further details).

Applications

The methods of this disclosure can be used for, among other thing, online closed-loop control system optimization, online sensing and evaluation of stability, and offline closed-loop control system design and optimization. Additionally, the STFT spectrogram-based closed-loop (STFT-SPM-CL) method can be used in a software package for automating the design and optimization of closed-loop control systems. Other applications will be described in the following sections.

Diagnosis and Early Fault Detection

The methods disclosed can be used to evaluate the performance of power converters in a variety of applications and identify performance degradation. This diagnosis can be used for early fault detection to protect the system being powered by the power converters. For example, the method can be used to provide notifications for required or suggested maintenance to prevent possible catastrophic faults. Possible uses include application in power grid, electric, and hybrid-electric vehicle system. Further applications include use in the aerospace, military, and medical fields.

Auto-Tuning Control System Based on STFT-SPM-CL Method and Sinusoidality Shape Method The auto-design and auto-tuning of closed-loop control of power converters is another area of application. As an example, power electronic circuits that are in power delivery networks may change as a result of an upgrade or partial redesign. The closed-loop control system of such power electronic circuits needs to be adjusted; otherwise, their performance can degrade. This could lead to a shortening of the lifetime of the system and an overall system performance reduction. Furthermore, electronic circuit components' characteristics (i.e. parasitic values) can change from factors such as aging, temperature variations, and manufacturing process variations, affecting the closed-loop control system performance. Systems operating in more environmentally taxing conditions such as aerospace and military systems are more affected by such changes.

The main drawback of most existing auto-tuning control systems is the requirement to continuously measure and approximate the system's transfer function. This effectively makes these systems act as gain-phase analyzer equipment. This adds complexity, cost, and size to the control system. Another drawback is that once the transfer function of the plant is measured, conventional control theories are used which adds more complexity to the system design.

Figure 9:
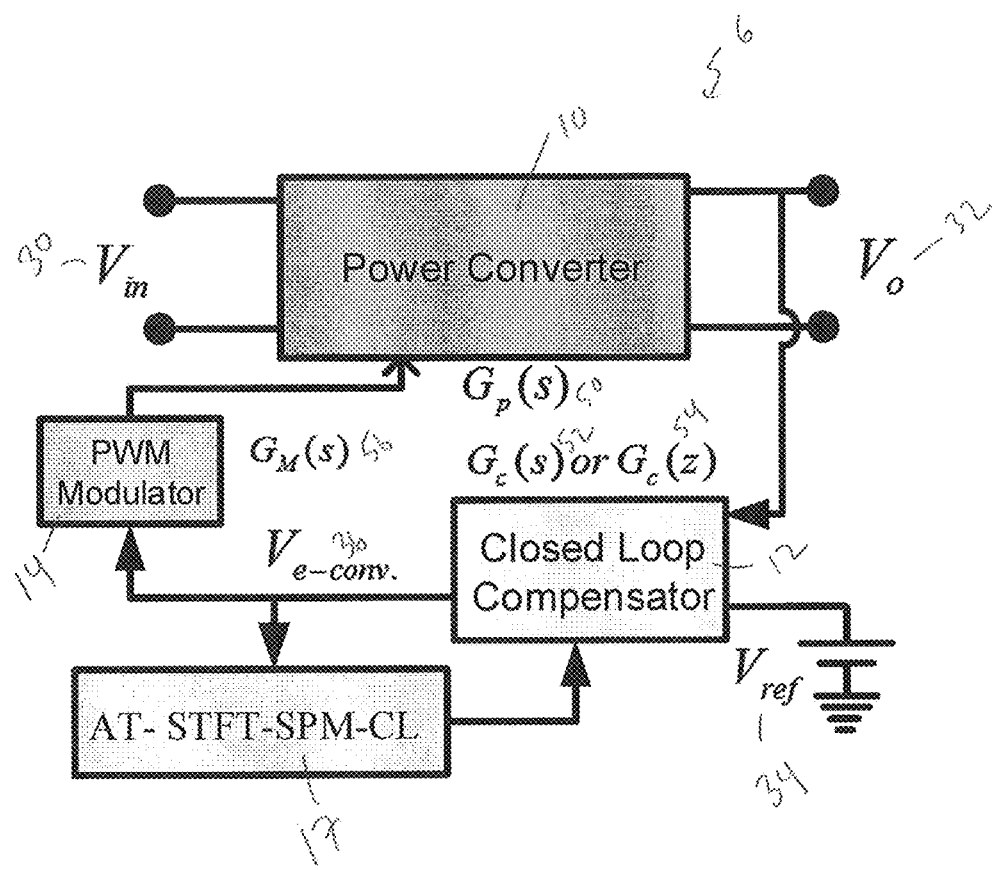
FIG. 9 shows an example of an on-line auto-tuning control system (AT-STFT-SPM-CL) based on the STFT-SPM-CL method.

An on-line auto-tuning control system (AT-STFT-SPM-CL) based on the STFT-SPM-CL as illustrated in the block diagram of FIG. 9 shows an example implementation. The STFT-SPM-CL method does not require the knowledge of the power converter's transfer function or frequency response, auto-tuning the closed-loop control system can be based on the time domain characteristics of the error signal 36. Instead the closed-loop compensator's gain, poles and zeros are adjusted by a AT-STFT-SPM-CL system 17 while observing the STFT spectrogram. Other variables could also be adjusted such as a power converter's capacitor value, inductor value, and switching frequency, among others. This allows the system maintain high performance under different environmental conditions. For example, if the power converter's electrical characteristics vary, (e.g. a change in the output capacitor value or inductor value) the auto-tuning control system can stabilize the power converter's closed-loop control system.

Per this disclosure, the same auto-tuning can also be done based on comparing the error signal to how close it is to an ideal sinusoidal signal at a given frequency as described earlier.

Hardware and Software Design Tools Based on STFT-SPM-CL Method and Simusoidality Shape Method The STFT-SPM-CL concept can be used as a part of a software-only or software hardware diagnosis tool, design tool, and/or auto-tuning tool. Once the concepts and algorithms discussed in the previous sections are developed, a software tool (or add-on tool to existing software) can be developed in order to be used by designers in designing, manually-tuning or auto-tuning power converter designs. Moreover, a hardware tool with a software interface can be developed in which power converter hardware can be plugged or connected to it for testing, diagnosis, and design optimization. Per this disclosure, the same can also be done based on comparing the error signal to how close it is to an ideal sinusoidal signal at a given frequency as described earlier.

That which is claimed:

1. A method of controlling the stability of a power converter or other type of plant in a closed-loop control system, comprising:
    inputting an output voltage of the power converter to a compensator;
    determining, using the compensator, an error signal comprising a difference between the output voltage and a reference voltage;
    evaluating an energy content in a short-time Fourier transform spectrogram of the error signal from the compensator;
    updating a transfer function of the compensator and other system variables in accordance with the energy content; and
    updating a duty cycle of a Pulse-Width-Modulator in accordance with the energy content to regulate the output voltage.

2. The method of claim 1, wherein the power converter comprises any member of the group consisting of: DC-DC power converter, AC-DC power converter, DC-AC power inverter, and AC-AC power inverter.

3. The method of claim 1, wherein the power converter comprises a circuit having a topology comprising any member of the group consisting of: a buck, boost and buck-boost.

4. The method of claim 1, wherein the power converter circuit has a topology comprising any member of the group consisting of: forward, flyback, push-pull, full-bridge, and half-bridge.

5. The method of claim 1, wherein the compensator comprises an integral, derivative, proportional-integral, proportional-derivative, or proportional-integral-derivative control system component.

6. The method of claim 1, wherein the stability of the power converter in the closed-loop control system is either the absolute or the relative stability of the system.

7. The method of claim 1, wherein the short-time Fourier transform spectrogram comprises the normalized squared magnitude of the short time Fourier transform of the input voltage to the power converter, and wherein the short time Fourier transform is computed as a continuous-time or discrete time function.

8. The method of claim 1, wherein the short-time Fourier transform spectrogram of the input voltage is computed by a computer or a digital signal processing chip using fast Fourier transform.

9. An apparatus for automatically tuning the stability of a power converter in a closed-loop control system, comprising:
    a compensator;
    a Pulse-Width-Modulator; and
    a processor
        wherein the processor evaluates an energy content in a short-time Fourier transform spectrogram of an error signal to update a duty cycle of the Pulse-Width-Modulator, and
        wherein the processor diagnoses the performance of the power converter for the detection of faults, providing notifications for maintenance.

10. The apparatus of claim 9, wherein the power converter in the closed-loop control system can be used for online sensing and evaluation of stability of the power converter and offline closed-loop control design and optimization.

11. The apparatus of claim 9, wherein the compensator comprises an integral, derivative, proportional-integral, proportional-derivative, or proportional-integral-derivative control system component.

* * * * *